United States Patent
Banister et al.

(10) Patent No.: US 10,208,158 B2
(45) Date of Patent: Feb. 19, 2019

(54) SUPER ELASTIC EPOXY HYDROGEL

(75) Inventors: Mark Banister, Tucson, AZ (US); Dominic McGrath, Tucson, AZ (US)

(73) Assignees: MEDIPACS, INC., Tucson, AZ (US); THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 12/373,245

(22) PCT Filed: Jul. 10, 2007

(86) PCT No.: PCT/US2007/073188
§ 371 (c)(1), (2), (4) Date: Jan. 9, 2009

(87) PCT Pub. No.: WO2008/079440
PCT Pub. Date: Jul. 3, 2008

(65) Prior Publication Data
US 2009/0317442 A1    Dec. 24, 2009

Related U.S. Application Data

(60) Provisional application No. 60/806,918, filed on Jul. 10, 2006.

(51) Int. Cl.
*C08G 59/22* (2006.01)
*C08G 59/50* (2006.01)

(52) U.S. Cl.
CPC ......... *C08G 59/22* (2013.01); *C08G 59/5006* (2013.01); *C08G 2250/00* (2013.01)

(58) Field of Classification Search
CPC .................. C08L 71/02; C08G 59/22
USPC ........................... 424/423; 525/403
See application file for complete search history.

(56) References Cited

U.S. PATENT DOCUMENTS

| | | | |
|---|---|---|---|
| 3,922,328 A | 11/1975 | Johnson | |
| 4,034,380 A | 7/1977 | Isayama | 347/19 |
| 4,111,202 A | 9/1978 | Theeuwes | |
| 4,190,411 A | 2/1980 | Fujimoto | |
| 4,203,440 A | 5/1980 | Theeuwes | |

(Continued)

FOREIGN PATENT DOCUMENTS

| | | | |
|---|---|---|---|
| CA | 2 477 181 | 4/2004 | |
| CN | 1080829 | 3/2002 | F04B 35/00 |

(Continued)

OTHER PUBLICATIONS

Yoshioka et al. "Electrically Driven Miniature Hydrogels as Muscle-Like Actuators", 2001; Proceedings of SPIE vol. 4329, pp. 216-222.*

(Continued)

*Primary Examiner* — Megan McCulley
(74) *Attorney, Agent, or Firm* — Hayes Soloway PC

(57) ABSTRACT

Described is a super elastic epoxy hydrogel that is easy to manufacture and can be engineered for various performance enhancements of the polymer. Also described are methods of enhancing the performance of this hydrogel and other hydrogels. Various polymer hydrogel composites, structures, and their uses are included, such as the actuator element comprising the hydrogel of the invention depicted in FIG. 2.

11 Claims, 1 Drawing Sheet

(56) References Cited

U.S. PATENT DOCUMENTS

Figure 1:
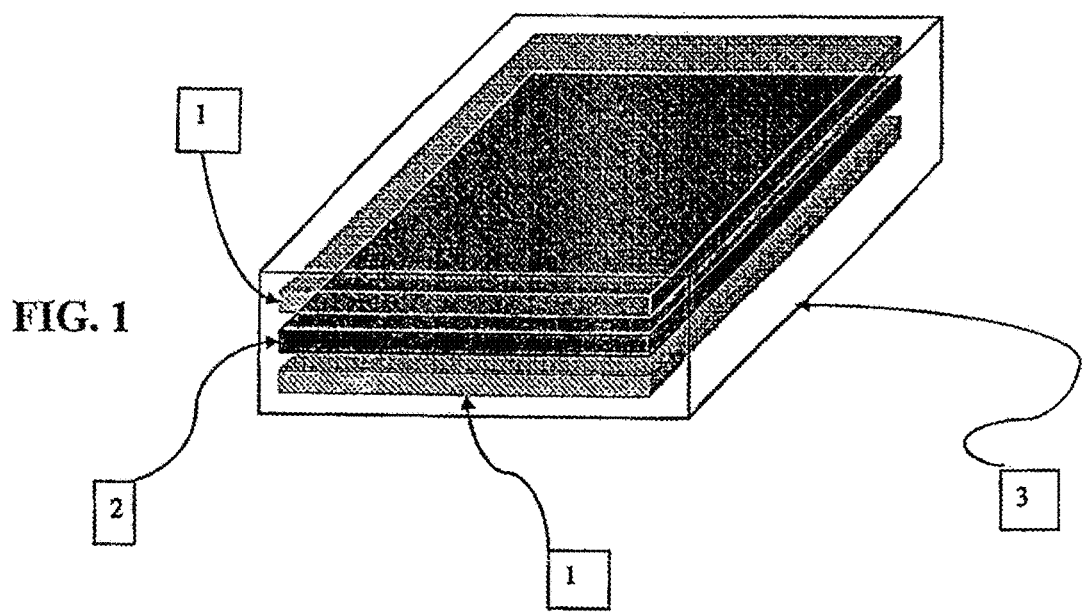

| | | | |
|---|---|---|---|
| 4,299,220 A | 11/1981 | Dorman | 604/118 |
| 4,327,725 A | 5/1982 | Cortese et al. | 424/427 |
| 4,395,719 A | 7/1983 | Majewski et al. | 347/68 |
| 4,423,166 A | 12/1983 | Moriarity et al. | 523/414 |
| 4,432,699 A | 2/1984 | Beckman et al. | 417/63 |
| 4,449,893 A | 5/1984 | Beckman | 417/322 |
| 4,449,983 A | 5/1984 | Cortese et al. | 604/892 |
| 4,507,363 A | 3/1985 | Chow et al. | 428/418 |
| 4,524,762 A | 6/1985 | Schulman | 297/284.1 |
| 4,538,607 A | 9/1985 | Saul | 128/207.16 |
| 4,551,139 A | 11/1985 | Plaas et al. | |
| 4,559,038 A | 12/1985 | Berg et al. | |
| 4,587,308 A | 5/1986 | Makita et al. | 525/373 |
| 4,595,583 A | 6/1986 | Eckenhoff et al. | |
| 4,624,847 A | 11/1986 | Ayer et al. | |
| 4,624,848 A | 11/1986 | Lee | |
| 4,650,469 A | 3/1987 | Berg et al. | |
| 4,655,767 A | 4/1987 | Woodward et al. | |
| 4,663,149 A | 5/1987 | Eckenhoff et al. | |
| 4,675,174 A | 6/1987 | Eckenhoff | |
| 4,723,958 A | 2/1988 | Pope et al. | |
| 4,772,474 A | 9/1988 | Eckenhoff et al. | |
| 4,781,714 A | 11/1988 | Eckenhoff et al. | |
| 4,808,084 A | 2/1989 | Tsubouchi et al. | 417/322 |
| 4,810,535 A | 3/1989 | McCollum et al. | 427/410 |
| 4,842,493 A | 6/1989 | Nilsson | 417/322 |
| 4,863,456 A | 9/1989 | Stephens et al. | |
| 4,948,592 A | 8/1990 | Ayer et al. | |
| 4,963,141 A | 10/1990 | Eckenhoff | |
| 4,986,260 A | 1/1991 | Iams | 601/149 |
| 5,000,957 A | 3/1991 | Eckenhoff et al. | |
| 5,029,939 A | 7/1991 | Smith | 297/284.1 |
| 5,034,229 A | 7/1991 | Magruder et al. | |
| 5,037,420 A | 8/1991 | Magruder et al. | |
| 5,059,423 A | 10/1991 | Magruder et al. | |
| 5,061,242 A | 10/1991 | Sampson | |
| 5,070,560 A | 12/1991 | Wilkinson | 5/455 |
| 5,100,933 A | 3/1992 | Tanaka et al. | 523/300 |
| 5,105,983 A | 4/1992 | Sancoff et al. | 222/103 |
| 5,110,596 A | 5/1992 | Magruder et al. | |
| 5,114,577 A | 5/1992 | Kusano et al. | 210/198.2 |
| 5,175,246 A * | 12/1992 | Smith | A61K 9/7061 523/111 |
| 3,029,743 A | 3/1993 | Johns | 103/150 |
| 5,192,197 A | 3/1993 | Culp | 417/322 |
| 5,192,298 A | 3/1993 | Culp | F04B 35/04 |
| 5,192,304 A | 3/1993 | Rassman | 5/933 |
| 5,232,702 A | 8/1993 | Pfister et al. | |
| 5,246,705 A | 9/1993 | Venkatraman et al. | |
| 5,267,365 A | 12/1993 | Walter | 5/683 |
| 5,275,853 A * | 1/1994 | Silvis | C08G 59/50 428/35.4 |
| 5,279,544 A | 1/1994 | Gross et al. | |
| 5,279,565 A | 1/1994 | Klein et al. | |
| 5,284,133 A | 2/1994 | Burns et al. | |
| 5,300,299 A | 4/1994 | Sweet et al. | |
| 5,304,121 A | 4/1994 | Sahatjian | |
| 5,327,041 A | 7/1994 | Culp | 310/328 |
| 5,328,696 A | 7/1994 | Noel | |
| 5,336,057 A | 8/1994 | Fukuda et al. | 417/395 |
| 5,348,746 A | 9/1994 | Dong et al. | |
| 5,354,264 A | 10/1994 | Bae et al. | |
| 5,376,378 A | 12/1994 | Li et al. | |
| 5,380,760 A | 1/1995 | Wendel et al. | |
| 5,412,821 A | 5/1995 | Wilkinson | 5/455 |
| 5,429,585 A | 7/1995 | Liang | 601/15 |
| 5,431,921 A | 7/1995 | Thombre | |
| 5,474,783 A | 12/1995 | Miranda et al. | |
| 5,520,643 A | 5/1996 | Ensminger et al. | 604/93 |
| 5,498,255 A | 8/1996 | Wong | |
| 5,546,932 A | 8/1996 | Galli | |
| 5,564,142 A | 10/1996 | Liu | 5/689 |
| 5,573,668 A | 11/1996 | Grosh et al. | |
| 5,587,237 A | 12/1996 | Korpman et al. | |
| RE35,474 E | 3/1997 | Woodard et al. | |
| 5,618,899 A | 4/1997 | Appelt et al. | |
| 5,622,482 A | 4/1997 | Lee | 417/321 |
| 5,630,709 A | 5/1997 | Bar-Cohen | 417/322 |
| 5,633,009 A | 5/1997 | Kenealy et al. | |
| 5,645,855 A | 7/1997 | Lorenz | |
| 5,656,286 A | 8/1997 | Miranda et al. | |
| 5,674,192 A | 10/1997 | Sahatjian et al. | |
| 5,687,748 A | 11/1997 | Conrad et al. | |
| 5,692,256 A | 12/1997 | Kramer et al. | 5/624 |
| 5,714,160 A | 2/1998 | Magruder et al. | |
| 5,718,700 A | 2/1998 | Edgren et al. | |
| 5,779,668 A | 7/1998 | Grabenkort | |
| 5,798,600 A | 8/1998 | Sager et al. | 310/330 |
| 5,810,001 A | 9/1998 | Genga et al. | 128/202.27 |
| 5,823,178 A | 10/1998 | Lloyd et al. | |
| 5,836,900 A | 11/1998 | Leventhal | 297/284.5 |
| 5,891,463 A | 4/1999 | Bello et al. | |
| 5,916,968 A | 6/1999 | Hariharan et al. | |
| 5,939,477 A | 8/1999 | Pretzer et al. | |
| 5,951,999 A | 9/1999 | Therriault et al. | |
| 5,954,706 A | 9/1999 | Sahatjian | |
| 5,955,549 A * | 9/1999 | Chang | C08F 283/00 525/418 |
| 5,961,298 A | 10/1999 | Bar-Cohen | 417/322 |
| 5,979,892 A | 11/1999 | Smith | 271/267 |
| 5,997,501 A | 12/1999 | Gross et al. | |
| 6,004,115 A | 12/1999 | Da Costa | F04B 17/00 |
| 6,010,485 A | 1/2000 | Buch-Rasmussen et al. | |
| 6,024,976 A | 2/2000 | Miranda et al. | |
| 6,066,325 A | 5/2000 | Wallace et al. | |
| RE36,754 E | 6/2000 | Noel | |
| 6,074,178 A | 6/2000 | Bishop et al. | 417/322 |
| 6,074,179 A | 6/2000 | Jokela | 417/322 |
| 6,106,245 A | 8/2000 | Cabuz | 417/322 |
| 6,109,852 A | 8/2000 | Shahinpoor et al. | 414/1 |
| 6,143,138 A | 11/2000 | Becker | 204/157.15 |
| 6,152,898 A | 11/2000 | Olsen | |
| 6,157,113 A | 12/2000 | Hunter et al. | 310/300 |
| 6,165,155 A | 12/2000 | Jacobsen et al. | |
| 6,174,546 B1 | 1/2001 | Therriault et al. | |
| 6,180,133 B1 | 1/2001 | Quan et al. | |
| 6,183,434 B1 | 2/2001 | Eppstein | |
| 6,184,608 B1 | 2/2001 | Cabuz | 310/309 |
| 6,193,996 B1 | 2/2001 | Effing et al. | |
| 6,206,850 B1 | 3/2001 | O'Neil | |
| 6,210,712 B1 | 4/2001 | Edgren et al. | |
| 6,213,739 B1 | 4/2001 | Phallen et al. | 417/478 |
| 6,221,383 B1 | 4/2001 | Miranda et al. | |
| 6,223,369 B1 | 5/2001 | Maier et al. | 5/713 |
| 6,249,076 B1 | 6/2001 | Madden et al. | 310/363 |
| 6,277,401 B1 | 8/2001 | Bello et al. | |
| 6,312,715 B1 | 11/2001 | Cantor et al. | |
| 6,316,022 B1 | 11/2001 | Mantelle et al. | |
| 6,319,245 B1 | 11/2001 | Berrigan | |
| 6,336,907 B1 | 1/2002 | Dono et al. | 601/150 |
| 6,337,086 B1 | 1/2002 | Kanios et al. | |
| 6,352,715 B1 | 3/2002 | Hwang et al. | |
| 6,365,178 B1 | 4/2002 | Venkateshwaran et al. | |
| 6,365,185 B1 | 4/2002 | Ritschel et al. | |
| 6,368,318 B1 | 4/2002 | Visuri et al. | |
| 6,378,292 B1 | 4/2002 | Youngner | 60/224 |
| 6,387,077 B1 | 5/2002 | Klibanov et al. | |
| 6,392,777 B1 | 5/2002 | Elliott et al. | 359/244 |
| 6,409,716 B1 | 6/2002 | Sahatjian et al. | |
| 6,450,773 B1 | 9/2002 | Upton | 417/53 |
| 6,461,644 B1 | 10/2002 | Jackson et al. | |
| 6,464,476 B2 | 10/2002 | Ross et al. | 417/478 |
| 6,471,686 B1 | 10/2002 | Berrigan | |
| 6,475,639 B2 | 11/2002 | Shahinpoor et al. | 428/614 |
| 6,490,483 B2 | 12/2002 | Willis | 604/20 |
| 6,531,152 B1 | 3/2003 | Lerner et al. | |
| 6,537,194 B1 | 3/2003 | Winkler | |
| 6,578,245 B1 | 6/2003 | Chatterjee et al. | 29/25.35 |
| 6,586,512 B1 * | 7/2003 | Dukes | A61L 15/26 524/377 |
| 6,632,522 B1 | 10/2003 | Hyde et al. | |
| 6,664,718 B2 | 12/2003 | Pelrine et al. | |
| 6,682,318 B2 | 1/2004 | Takeuchi | 417/322 |
| 6,682,500 B2 | 1/2004 | Soltanpour et al. | 604/9 |

(56) References Cited

U.S. PATENT DOCUMENTS

| | | | |
|---|---|---|---|
| 6,685,442 B2 | 2/2004 | Chinn et al. | 417/321 |
| 6,726,678 B1 | 4/2004 | Nelson | 604/891.1 |
| 6,766,817 B2 | 7/2004 | Da Silva | F04F 10/00 |
| 6,791,003 B1 | 9/2004 | Choi et al. | |
| 6,796,970 B1 | 9/2004 | Klitmose et al. | |
| 6,809,462 B2 | 10/2004 | Pelrine et al. | 310/319 |
| 6,829,797 B2 | 12/2004 | Partian | 5/710 |
| 6,864,295 B2 | 3/2005 | Mitarai | 521/50.5 |
| 6,869,275 B2 | 3/2005 | Dante et al. | 417/413.2 |
| 6,876,135 B2 | 4/2005 | Pelrine et al. | 310/339 |
| 6,902,704 B2 | 6/2005 | Wilson | 422/100 |
| 6,940,211 B2 | 9/2005 | Pelrine et al. | 310/330 |
| 6,948,636 B1 | 9/2005 | Fischer et al. | 222/103 |
| 6,949,079 B1 | 9/2005 | Westberg et al. | 604/6.11 |
| 6,955,923 B2 | 10/2005 | Hartting | 436/180 |
| 6,960,864 B2 | 11/2005 | Urano et al. | 310/307 |
| 7,166,224 B2 | 1/2007 | Tonkin et al. | 210/640 |
| 7,201,844 B1 | 4/2007 | Hammen et al. | 210/198.2 |
| 7,285,255 B2 | 10/2007 | Kadlec et al. | A61L 2/16 |
| 7,411,792 B2 | 8/2008 | Richards et al. | 361/704 |
| 7,453,187 B2 | 11/2008 | Richards et al. | 310/339 |
| 7,458,956 B1 | 12/2008 | Adams | 604/158 |
| 7,494,572 B2 | 2/2009 | Tonkin et al. | 203/10 |
| 7,544,260 B2 | 6/2009 | Banister et al. | 149/2 |
| 7,553,903 B2 * | 6/2009 | Riegel et al. | 524/599 |
| 7,572,239 B1 | 8/2009 | Brotz | 601/148 |
| 7,700,129 B2 | 4/2010 | Ito et al. | 424/486 |
| 7,771,176 B2 | 8/2010 | Weber | 417/410.2 |
| 7,820,427 B2 | 10/2010 | Unger et al. | 435/286.5 |
| 8,190,270 B2 | 5/2012 | Wingeier et al. | 607/116 |
| 8,695,640 B2 | 4/2014 | Unger et al. | 137/833 |
| 2001/0053383 A1 | 12/2001 | Miranda et al. | |
| 2002/0001571 A1* | 1/2002 | Wu | A61K 9/009 424/61 |
| 2002/0004064 A1 | 1/2002 | Quan et al. | |
| 2002/0007014 A1 | 1/2002 | Hyde et al. | |
| 2002/0010412 A1 | 1/2002 | Eppstein | |
| 2002/0015733 A1 | 2/2002 | Flasher-Barak et al. | |
| 2002/0027384 A1 | 3/2002 | Zur | 297/452.41 |
| 2002/0043895 A1 | 4/2002 | Richards et al. | 310/328 |
| 2002/0073489 A1 | 6/2002 | Totton | 5/713 |
| 2002/0106402 A1 | 8/2002 | Hartwig | |
| 2002/0115740 A1* | 8/2002 | Beuhler et al. | 522/152 |
| 2002/0128572 A1 | 9/2002 | Chang | 601/148 |
| 2002/0128618 A1* | 9/2002 | Frenz et al. | 604/368 |
| 2002/0147208 A1 | 10/2002 | Fleshner-Barak et al. | |
| 2002/0156463 A1 | 10/2002 | Berrigan | |
| 2002/0173745 A1 | 11/2002 | Santini et al. | 604/67 |
| 2002/0183738 A1 | 12/2002 | Chee et al. | |
| 2002/0193754 A1 | 12/2002 | Cho | |
| 2003/0014036 A1 | 1/2003 | Varner et al. | |
| 2003/0051292 A1 | 3/2003 | Ferrand et al. | 5/600 |
| 2003/0054025 A1 | 3/2003 | Cantor et al. | |
| 2003/0065303 A1 | 4/2003 | Wellman et al. | |
| 2003/0069359 A1* | 4/2003 | Torii et al. | 525/178 |
| 2003/0072792 A1 | 4/2003 | Flanigan et al. | |
| 2003/0108590 A1 | 6/2003 | Peery et al. | |
| 2003/0124189 A1 | 7/2003 | Zentner et al. | |
| 2003/0135158 A1 | 7/2003 | Gonnelli | |
| 2003/0139495 A1 | 7/2003 | Zentner et al. | |
| 2003/0143257 A1 | 7/2003 | Fleshner-Barak et al. | |
| 2003/0152616 A1 | 8/2003 | Hartwig | |
| 2003/0153900 A1 | 8/2003 | Aceti et al. | |
| 2003/0156953 A1 | 8/2003 | Chinn et al. | 417/332 |
| 2003/0163099 A1 | 8/2003 | Wermeling et al. | |
| 2003/0216683 A1 | 11/2003 | Shekalim | |
| 2003/0232198 A1 | 12/2003 | Lamberti et al. | |
| 2004/0030262 A1 | 2/2004 | Fisher et al. | |
| 2004/0068224 A1 | 4/2004 | Couvillon et al. | 604/67 |
| 2004/0092865 A1 | 5/2004 | Flaherty et al. | |
| 2004/0102762 A1 | 5/2004 | Gilbert | |
| 2004/0106893 A1 | 6/2004 | Hunter | |
| 2004/0106894 A1 | 6/2004 | Hunter | |
| 2004/0112442 A1 | 6/2004 | Maerkl et al. | 137/597 |
| 2004/0133159 A1 | 7/2004 | Haider et al. | |
| 2004/0138603 A1 | 7/2004 | Cleary et al. | |
| 2004/0142023 A1 | 7/2004 | Hartwig | |
| 2004/0149288 A1 | 8/2004 | Koch | |
| 2004/0176502 A1 | 9/2004 | Raymond et al. | 523/416 |
| 2004/0176748 A1 | 9/2004 | Abramson et al. | |
| 2004/0186419 A1 | 9/2004 | Cho | |
| 2004/0202708 A1 | 10/2004 | Roehrig et al. | |
| 2004/0204677 A1 | 10/2004 | Wellman et al. | |
| 2004/0219194 A1 | 11/2004 | Finckh et al. | |
| 2004/0220548 A1 | 11/2004 | Heruth et al. | |
| 2004/0234401 A1 | 11/2004 | Banister | 417/474 |
| 2004/0242709 A1 | 12/2004 | Oguro et al. | 521/27 |
| 2004/0265545 A1 | 12/2004 | McKean et al. | 428/189 |
| 2005/0009976 A1 | 1/2005 | Akkapeddi et al. | 524/445 |
| 2005/0033230 A1 | 2/2005 | Alchas et al. | |
| 2005/0043657 A1 | 2/2005 | Couvillon | 601/134 |
| 2005/0058695 A1 | 3/2005 | Anigbogu et al. | |
| 2005/0137577 A1 | 6/2005 | Heruth et al. | |
| 2005/0137578 A1 | 6/2005 | Heruth et al. | |
| 2005/0137579 A1 | 6/2005 | Heruth et al. | |
| 2005/0261631 A1 | 11/2005 | Clarke et al. | |
| 2005/0273081 A1 | 12/2005 | Olsen | |
| 2005/0273082 A1 | 12/2005 | Olsen | |
| 2005/0287214 A1 | 12/2005 | Ayer et al. | |
| 2006/0021614 A1 | 2/2006 | Wermeling et al. | |
| 2006/0076540 A1 | 4/2006 | Zama et al. | 252/500 |
| 2006/0078603 A1 | 4/2006 | Nguyen | |
| 2006/0078604 A1 | 4/2006 | Kanios et al. | |
| 2006/0084942 A1 | 4/2006 | Kim et al. | |
| 2006/0089619 A1 | 4/2006 | Ginggen | 604/891.1 |
| 2006/0094985 A1 | 5/2006 | Aceti et al. | |
| 2006/0094989 A1 | 5/2006 | Scott et al. | 601/5 |
| 2006/0110596 A1 | 5/2006 | Palasz et al. | |
| 2006/0135911 A1 | 6/2006 | Mittur | |
| 2006/0142478 A1* | 6/2006 | Luo | C08B 11/12 525/54.1 |
| 2006/0142875 A1 | 6/2006 | Keyes et al. | 700/1 |
| 2006/0146475 A1 | 7/2006 | Zhong et al. | 361/301.1 |
| 2006/0183216 A1 | 8/2006 | Handique et al. | 435/287.1 |
| 2006/0188558 A1 | 8/2006 | Jackson et al. | |
| 2006/0195057 A1 | 8/2006 | Kriesel et al. | 604/19 |
| 2006/0200083 A1 | 9/2006 | Freyman et al. | 604/181 |
| 2006/0204532 A1 | 9/2006 | John | |
| 2006/0213674 A1 | 9/2006 | Dierker, Jr. et al. | |
| 2006/0276744 A1 | 12/2006 | Falk | |
| 2007/0021697 A1 | 1/2007 | Ginther et al. | |
| 2007/0031495 A1 | 2/2007 | Eppstein et al. | |
| 2007/0033738 A1 | 2/2007 | Tu | 5/710 |
| 2007/0052139 A1 | 3/2007 | Gilbert | |
| 2007/0070684 A1 | 3/2007 | Poulos | 365/149 |
| 2007/0078376 A1 | 4/2007 | Smith | |
| 2007/0082038 A1 | 4/2007 | Gale et al. | |
| 2007/0088267 A1 | 4/2007 | Shekalim | |
| 2007/0092570 A1 | 4/2007 | Missel et al. | |
| 2007/0098771 A1 | 5/2007 | Audett et al. | |
| 2007/0098772 A1 | 5/2007 | Westcott et al. | |
| 2007/0100355 A1 | 5/2007 | Bonde et al. | |
| 2007/0104771 A1 | 5/2007 | Audett et al. | |
| 2007/0134310 A1 | 6/2007 | Nedberge et al. | |
| 2007/0148218 A1 | 6/2007 | Gordon | |
| 2007/0190150 A1 | 8/2007 | Ito et al. | 424/486 |
| 2007/0224253 A1 | 9/2007 | Franklin | |
| 2007/0260201 A1 | 11/2007 | Prausnitz et al. | |
| 2007/0269522 A1 | 11/2007 | Wold | |
| 2007/0293826 A1 | 12/2007 | Wall et al. | |
| 2008/0004421 A1 | 1/2008 | Chenault | 528/310 |
| 2008/0009800 A1 | 1/2008 | Nickel | |
| 2008/0015494 A1 | 1/2008 | Santini, Jr. et al. | |
| 2008/0033228 A1 | 2/2008 | Rastegar et al. | 600/16 |
| 2008/0039791 A1 | 2/2008 | Abboud et al. | 604/113 |
| 2008/0058706 A1 | 3/2008 | Zhang et al. | |
| 2008/0063698 A1 | 3/2008 | Hartwig | |
| 2008/0091139 A1 | 4/2008 | Srinivasan et al. | 604/68 |
| 2008/0110463 A1 | 5/2008 | Hajgato et al. | |
| 2008/0125513 A1 | 5/2008 | Kristiansen | 523/113 |
| 2008/0125744 A1 | 5/2008 | Treacy | |
| 2008/0152592 A1 | 6/2008 | Rebec | |
| 2008/0167641 A1 | 7/2008 | Hansen et al. | |
| 2008/0183144 A1 | 7/2008 | Trautman et al. | |

(56) References Cited

U.S. PATENT DOCUMENTS

| | | | |
|---|---|---|---|
| 2008/0195018 A1 | 8/2008 | Larson et al. | 602/53 |
| 2008/0208107 A1 | 8/2008 | McRae et al. | |
| 2008/0214987 A1 | 9/2008 | Xu | |
| 2008/0221552 A1 | 9/2008 | Leonard | |
| 2008/0234656 A1 | 9/2008 | Pettis et al. | |
| 2008/0312610 A1 | 12/2008 | Binks et al. | |
| 2008/0317615 A1 | 12/2008 | Banister | 417/413.1 |
| 2009/0007904 A1 | 1/2009 | Schuster et al. | |
| 2009/0020521 A1 | 1/2009 | Blaszczykiewicz et al. | 219/529 |
| 2009/0026069 A1 | 1/2009 | Liao et al. | 204/274 |
| 2009/0041833 A1 | 2/2009 | Bettinger et al. | |
| 2009/0042970 A1 | 2/2009 | Herschkowitz et al. | |
| 2009/0048555 A1 | 2/2009 | Stryker et al. | |
| 2009/0060986 A1 | 3/2009 | Yum et al. | |
| 2009/0085444 A1 | 4/2009 | Alvarez Icaza Rivera et al. | 310/365 |
| 2009/0093912 A1 | 4/2009 | Wilker | 700/282 |
| 2009/0099545 A1 | 4/2009 | Nilsson et al. | |
| 2009/0118662 A1 | 5/2009 | Schnall | |
| 2009/0144909 A1 | 6/2009 | Skinner | 5/713 |
| 2009/0164239 A1 | 6/2009 | Hayter et al. | 705/2 |
| 2009/0193690 A1 | 8/2009 | Hata | 5/713 |
| 2009/0221971 A1 | 9/2009 | Mejlhede et al. | |
| 2009/0227988 A1 | 9/2009 | Wood, Jr. et al. | 604/891.1 |
| 2009/0232685 A1 | 9/2009 | Kamitani et al. | 417/413.2 |
| 2009/0317442 A1 | 12/2009 | Banister et al. | 424/423 |
| 2010/0004638 A1 | 1/2010 | Gibson | 604/891.1 |
| 2010/0074953 A1* | 3/2010 | Chaouk et al. | 424/484 |
| 2010/0180384 A1 | 7/2010 | Balonick | 5/709 |
| 2011/0172645 A1 | 7/2011 | Moga et al. | |
| 2012/0029430 A1 | 2/2012 | Banister et al. | 604/151 |
| 2012/0278956 A1 | 11/2012 | Hartman | 800/323 |
| 2013/0172180 A1* | 7/2013 | Naumann | A61L 15/60 502/402 |
| 2013/0337566 A1* | 12/2013 | Schmidt | C12N 5/0068 435/404 |
| 2014/0048558 A1 | 2/2014 | Lee | 222/95 |

FOREIGN PATENT DOCUMENTS

| | | | |
|---|---|---|---|
| CN | 1369039 | 9/2002 | B01L 3/00 |
| CN | 1845967 | 10/2006 | C08L 77/00 |
| CN | 1934776 A | 3/2007 | H02N 11/00 |
| DE | 199 12 606 | 12/2000 | F04B 43/04 |
| EP | 0 723 982 | 7/1996 | C08G 59/56 |
| EP | 0 736 556 | 10/1996 | C08G 59/50 |
| EP | 0882890 | 12/1998 | F04B 45/053 |
| EP | 1 454 935 | 9/2004 | C08G 59/00 |
| GB | 2337690 | 12/1999 | E02B 15/04 |
| JP | 58-25326 | 2/1983 | |
| JP | 60-235847 | 11/1985 | |
| JP | 02-004826 | 1/1990 | |
| JP | 02 137 930 | 5/1990 | B41J 2/05 |
| JP | 08-283540 | 10/1996 | |
| JP | 09 287 571 | 11/1997 | F04B 43/04 |
| JP | 2004-514770 | 5/2004 | |
| JP | 2004-261045 | 9/2004 | |
| JP | 2004-269882 | 9/2004 | |
| JP | 2005269773 | 9/2005 | F03G 7/00 |
| JP | 2006353034 | 12/2006 | H02N 2/00 |
| JP | 2008211915 | 9/2008 | F03G 7/00 |
| JP | 2009046649 | 3/2009 | C08F 12/34 |
| JP | 2009543902 | 12/2009 | C08G 59/50 |
| WO | WO 96/17170 | 6/1996 | F04B 35/00 |
| WO | WO96/20971 | 7/1996 | C08G 63/00 |
| WO | WO 97/42412 | 11/1997 | F04B 43/12 |
| WO | WO 00/28215 | 5/2000 | F04B 45/047 |
| WO | WO02/44240 | 6/2002 | C08G 59/40 |
| WO | WO 2004/031581 | 4/2004 | |
| WO | WO2004031580 | 4/2004 | F04B 43/04 |
| WO | WO 2004/076859 | 9/2004 | F04B 43/04 |
| WO | WO 2005061014 | * 7/2005 | |
| WO | WO 2005/118008 | 12/2005 | |
| WO | WO 2006/065884 | 6/2006 | |
| WO | WO 2008/079440 | 7/2008 | C08L 63/10 |
| WO | WO2008129549 | 10/2008 | A61M 5/148 |
| WO | WO 2009/069086 | 4/2009 | |
| WO | WO2011032011 | 3/2011 | A61M 5/142 |
| WO | WO2011094747 | 8/2011 | C08J 5/20 |

OTHER PUBLICATIONS

European Search Report dated Jun. 8, 2009.
European Office Action dated Sep. 14, 2009, Appln. No. 07 872 242.8-2102, (6 pgs).
"Epoxy-Based Electroactive Polymer Gels", Yoshioka Y and Calvert P, Experimental Mechanics, vol. 42, No. 4, Dec. 2002, pp. 404-408.
European Official Action.Apr. 6, 2011 issued in Appln. No. 07 872 242.8-2102 (4 pages).
Chinese Official Action + translation dated Feb. 1, 2011 issued in Appln. No. 200780032137.3, (10 pgs).
Chinese Office Action (w/English translation) issued in corresponding application No. 200780032137.3, dated Mar. 12, 2013 (14 pgs).
Japanese Office Action with translation, Patent Appln. 2009-519642, dated Jul. 9, 2012 (10 pgs).
Chinese Office Action and Translation dated Jul. 6, 2011 issued in Chinese Patent Appln. No. 200780032137.3 (7 pgs).
Chinese Office Action, dated Dec. 23, 2011 (6 pgs).
European Official Action, dated Aug. 29, 2011 issued in Appln. No. 07 872 242.8-2102 (6 pages).
"An Electrochemical Microactuator: Principle and First Results", Neagu et al. Journal of Microelectromechanical Systems, vol. 5, No. 1, Mar. 1996 (7 pgs).
"ElectroActive Polymers—EAPs," downloaded from http://www.azom.com on Dec. 16, 2013 (5 pgs).
"Magnetic Driven Compression Cascade and Packaging", IBM Technical Disclosure Bulletin, IBM Corp., col. 38, co. 1, Jan. 1995 (3 pgs).
"Micro-Dispensing Positive Displacement Pump", Anonymous, Research Disclosure, Mason Publications, Hampshire GB, vol. 374, No. 4, Jun. 1995 (9 pgs).
"Structure and Mechanism of Two Types of Micro-Pump Using Polymer Gel", Hattori et al., Micro Electro Mechanical Systems, 1992, MEMS 92, Proceedings. An Investigation of Micro Structures, Sensors, Actuators, Machines and Robot, IEEE Travemunde, Germany, Feb. 1992 (6 pgs).
Bar-Cohen, Y., "Electroactive polymers (EAP) actuators as artificial muscles: reality, potential and challenges," SPIE Press, 2001, 671 pgs, (book description only, 4 pgs).
Canadian Official Action issued in Appln. No. 2,557,325, dated Feb. 8, 2011 (5 pgs).
Chinese Notification of ReExamination and English translation, Appln. or Pat. No. 200580048306.3; dated Aug. 22, 2014 (11 pgs).
Chinese Office Action dated Jul. 1, 2014 with English translation, Appln. No. or Patent No. 201180007957.3 (17 pgs).
Chinese Official Action dated Mar. 17, 2011, Appln. No. 200580048306.3 (5 pgs).
Chinese Official Action issued in corresponding Chinese Patent Appln. Serial No. 200580048306.3 dated Nov. 4, 2011 (5 pgs).
European Official Action issued in Appln. No. 04714231.0, dated May 11, 2011 (2 pgs).
European Official Action issued in Appln. No. 04714231.0-2315/ 1611353, dated Oct. 4, 2010 (4 pgs).
European Search Report dated Feb. 18, 2011 issued in corresponding Appln. No. 10014840.2-2315 (7 pgs).
First Examination Report dated Dec. 31, 2013, Indian Patent Application No. 3011/CHENP/2007 (2 pgs).
Indian Examination Report; Indian Patent Application Serial No. 2371/CHENP/2005, dated Sep. 7, 2006 (2 pgs).
International Preliminary Report on Patentability issued in PCT/US10/48489 dated Mar. 13, 2012 (12 pgs).
International Search Report and Written Opinion issued in corresponding PCT Patent Appln. Serial No. PCT/US2012/057129 dated Apr. 1, 2014 ( 7 pgs).

(56) References Cited

OTHER PUBLICATIONS

International Search Report and Written Opinion of the International Search Authority issued in PCT/US09/34557, dated Apr. 13, 2009 (6 pgs).
Office Action issued in related U.S. Appl. No. 10/786,718, dated Mar. 5, 2008 (41 pgs).
Office Action issued in related U.S. Appl. No. 10/786,718, dated Sep. 16, 2008 (8 pgs).
Office Action issued in related U.S. Appl. No. 10/786,718, dated Jan. 2, 2009 (9 pgs).
Office Action issued in related U.S. Appl. No. 10/786,718, dated Jul. 1, 2009 (7 pgs).
Office Action issued in related U.S. Appl. No. 10/786,718, dated Dec. 28, 2009 (6 pgs).
Office Action issued in related U.S. Appl. No. 10/786,718, dated May 5, 2010 (7 pgs).
Office Action issued in related U.S. Appl. No. 10/786,718, dated Sep. 15, 2010 (8 pgs).
Office Action issued in related U.S. Appl. No. 10/786,718, dated Nov. 23, 2010 (10 pgs).
Office Action issued in related U.S. Appl. No. 11/254,537, dated Sep. 17, 2007 (8 pgs).
Office Action issued in related U.S. Appl. No. 11/254,537, dated Mar. 4, 2008 (8 pgs).
Office Action issued in related U.S. Appl. No. 11/254,537, dated Jul. 21, 2008 (10 pgs).
Office Action issued in related U.S. Appl. No. 11/254,537, dated Dec. 15, 2008 (8 pgs).
Office Action issued in related U.S. Appl. No. 12/414,536, dated Nov. 29, 2010 (8 pgs).
Office Action issued in related U.S. Appl. No. 12/978,152, dated May 23, 2011 (9 pgs).
Office Action issued in related U.S. Appl. No. 13/018,024, dated Aug. 7, 2014 (17 pgs).
Office Action issued in related U.S. Appl. No. 13/093,648, dated Aug. 29, 2013 (5 pgs).
Office Action issued in related U.S. Appl. No. 13/395,627, dated Sep. 10, 2014 (9 pgs).
Office Action issued in related U.S. Appl. No. 13/424,172, dated Jun. 27, 2012 (14 pgs).
Office Action issued in related U.S. Appl. No. 13/424,172, dated Nov. 9, 2012 (6 pgs).
Office Action issued in related U.S. Appl. No. 14/071,371, dated Aug. 21, 2014 (16 pgs).
Office Action issued in related U.S. Appl. No. 12/745,880, dated Jun. 3, 2013 (8 pgs).
Office Action dated Nov. 23, 2012 in U.S. Appl. No. 12/745,880 (26 pgs.).
Official Action received in corresponding Chinese Application No. 200480010203.3, dated Sep. 14, 2007 (19 pgs).
Official Action received in corresponding Chinese Application No. 200480010203.3, dated Nov. 14, 2008 (5 pgs).
Official Action received in corresponding EPO Application. No. 04 714 231.0-2315, dated Nov. 13, 2008 (5 pgs).
Official Action, U.S. Appl. No. 11/721,800, dated Aug. 27, 2010 (13 pgs).
PCT International Preliminary Report on Patentability, dated Aug. 26, 2005, PCT/US04/005922 (11 pgs).
PCT International Search Resort and Written Opinion, dated Oct. 22, 2004, PCT/US04/005922 (17 pgs).
PCT International Search Report and International Preliminary Report on Patentability, dated Oct. 25, 2006, PCT/US05/45210 (10 pgs).
PCT International Search Report and International Preliminary Report on Patentability, dated Jul. 7, 2008, PCT/US07/73188 (8 pgs).
PCT International Search Report and International Preliminary Report on Patentability, dated Feb. 19, 2009, PCT/US08/85421 (7 pgs).
PCT International Search Resort and Written Opinion dated Mar. 28, 2011 PCT/US11/23375 (10 pgs).
PCT International Preliminary Report on Patentability issued in PCT/US2013/031062, dated Sep. 16, 2014 (9 pgs).
Search Report and Written Opinion received in Applicant's corresponding European Patent Application Serial No. 05854009.7, dated Nov. 11, 2009 (8 pgs).
Supplemental European Search Report issued in EP04714231, dated Jan. 25, 2007 (2 pgs).
Unsolicited letter from Dr. Elson Silva, dated Oct. 21, 2010 (5 pgs).
Office Action issued in related U.S. Appl. No. 14/071,371, dated Dec. 18, 2014 (11 pgs).
Japanese Office Action (with translation) issued in related application No. 2012-551386, dated Jan. 28, 2015 (9 pgs).
Office Action issued in related U.S. Appl. No. 13/395,627, dated Feb. 5, 2015 (7 pgs).
Chinese Board Decision, Appln. No. 200580048306.3, dated Dec. 26, 2014 (14 pgs).
Office Action issued in related U.S. Appl. No. 12/918,466, dated Jul. 11, 2013 (36 pgs).
India Hearing Notice in Reference of Application No. 3011/CHENP/2007, dated Feb. 5, 2015 (1 pg).
Office Action issued in U.S. Appl. No. 13/018,024, dated Feb. 24, 2015 (12 pgs).
Office Action issued in U.S. Appl. No. 13/424,172, dated Jun. 10, 2015 (14 pgs).
Office Action issued in U.S. Appl. No. 14/347,597, dated Jun. 3, 2015 (12 pgs).
Indian Office Action issued in application No. 137/CHENP/2009, dated Mar. 17, 2015 (2 pgs).
Office Action issued in U.S. Appl. No. 12/745,880, dated Jul. 22, 2015 (16 pgs).
Chinese Office Action issued in application No. 201180007957.3, dated May 22, 2015, with English translation (15 pgs).
Office Action issued in U.S. Appl. No. 13/018,024, dated Aug. 4, 2015 (10 pgs).
Notice of Allowance issued in U.S. Appl. No. 13/395,627, dated Sep. 16, 2015 (22 pgs).
Office Action issued in U.S. Appl. No. 12/373,245, dated Sep. 9, 2015 (20 pgs).
Chinese Office Action issued in application No. 201280057499.9, dated Aug. 28, 2015 (13 pgs).
Indian Office Action issued in application No. 137/CHENP/2009, dated Oct. 29, 2015 (2 pgs).
Chinese Office Action issued in application No. 201180007957.3, dated Feb. 15, 2016 (12 pgs).
European Office Action issued in application No. 13 760 829.5, dated Jan. 26, 2016 (4 pgs).
Notice of Allowance issued in U.S. Appl. No. 13/018,024, dated Mar. 2, 2016 (24 pgs).
Office Action issued in U.S. Appl. No. 12/745,880, dated Feb. 26, 2016 (13 pgs).
Office Action issued in U.S. Appl. No. 13/424,172, dated Feb. 24, 2016 (22 pgs).
Office Action issued in U.S. Appl. No. 14/347,597, dated Feb. 25, 2016 (32 pgs).
Office Action issued in U.S. Appl. No. 14/385,403, dated Mar. 30, 2016 (32 pgs).
Office Action issued in U.S. Appl. No. 12/918,466, dated Nov. 19, 2015 (25 pgs).
Extended European Search Report issued in application No. 12836396.7, dated Nov. 10, 2015 (12 pgs).
Chinese Office Action (w/translation) issued in application No. 201380022758.9, dated Dec. 14, 2015 (12 pgs).
Banister et al., "Molecular Engineering of Polymer Actuators for Biomedical and Industrial Use," Electroactive Polymer Actuators and Devices (EAPAD) 2012, vol. 8340 (20 pgs).
Chinese Office Action (w/translation) issued in application No. 201510131814.3, dated Aug. 22, 2016 (16 pgs).
Chinese Office Action issued in application No. 201180007957.3, dated Oct. 24, 2016 (12 pgs).
European Invitation issued in application No. 11 737 864.6, dated Dec. 19, 2016 (2 pgs).

(56) References Cited

OTHER PUBLICATIONS

European Search Report issued in application No. 13760829.5, dated Nov. 28, 2016 (11 pgs).
Indian Hearing Notice issued in application No. 137/CHENP/2009, dated Sep. 11, 2016 (3 pgs).
Japanese Office Action (no translation) issued in application No. 2010-537033, dated Sep. 10, 2013 (1 pg).
Japanese Office Action (no translation) issued in application No. 2010-537033, dated Apr. 10, 2013 (2 pgs).
Japanese Office Action (w/translation) issued in application No. 2015-500577, dated Jan. 4, 2017 (9 pgs).
Office Action issued in U.S. Appl. No. 12/918,466, dated Feb. 23, 2017 (38 pgs).
Office Action issued in U.S. Appl. No. 13/424,172, dated Sep. 20, 2016 (21 pgs).
Office Action issued in U.S. Appl. No. 14/385,403, dated Dec. 7, 2016 (22 pgs).
Chinese Office Action issued in application No. 201380022758.9, dated Aug. 15, 2016 (8 pgs).
Notice of Allowance issued in U.S. Appl. No. 12/745,880, dated Oct. 7, 2016 (23 pgs).
Office Action issued in U.S. Appl. No. 14/347,597, dated Oct. 7, 2016 (22 pgs).
Indian Office Action issued in application No. 1849/MUMNP/2012, dated Jun. 13, 2018 (6 pgs).
International Preliminary Report on Patentability issued in application No. PCT/US2016/024073, dated Oct. 5, 2017 ( pgs).
International Search Report and Written Opinion issued in application No. PCT/US2016/024073, dated Jun. 17, 2016 (8 pgs).
Office Action issued in U.S. Appl. No. 14/997,254, dated Apr. 4, 2018 (18 pgs).
U.S. Appl. No. 10/786,718, filed Feb. 24, 2004.
U.S. Appl. No. 11/254,537, filed Oct. 20, 2005.
U.S. Appl. No. 11/721,800, filed Jun. 14, 2007.
U.S. Appl. No. 12/414,536, filed Mar. 30, 2009.
U.S. Appl. No. 12/745,880, filed Jun. 2, 2010.
U.S. Appl. No. 12/918,466, filed Aug. 19, 2010.
U.S. Appl. No. 12/978,152, filed Dec. 23, 2010.
U.S. Appl. No. 13/018,024, filed Jan. 31, 2011.
U.S. Appl. No. 13/093,648, filed Apr. 25, 2011.
U.S. Appl. No. 13/395,627, filed Mar. 12, 2012.
U.S. Appl. No. 13/424,172, filed Mar. 19, 2012.
U.S. Appl. No. 14/071,371, filed Nov. 4, 2013.
U.S. Appl. No. 14/347,597, filed Mar. 26, 2014.
U.S. Appl. No. 14/385,403, filed Sep. 15, 2014.
U.S. Appl. No. 12/745,880, filed Jun. 2, 2010, Banister et al.
U.S. Appl. No. 12/918,466, filed Aug. 19, 2010, Smith et al.
U.S. Appl. No. 13/018,024, filed Jan. 31, 2011, Banister et al.
U.S. Appl. No. 13/093,648, filed Apr. 25, 2011, Banister et al.
U.S. Appl. No. 13/395,627, filed Mar. 12, 2012, Banister et al.
U.S. Appl. No. 13/424,172, filed Mar. 19, 2012, Banister.
U.S. Appl. No. 14/071,371, filed Nov. 4, 2013, Banister.
U.S. Appl. No. 14/347,597, filed Mar. 26, 2014, Banister et al.
U.S. Appl. No. 14/385,403, filed Sep. 15, 2014, Banister et al.

* cited by examiner

SUPER ELASTIC EPOXY HYDROGEL

This invention was made in part with Government support under contract number W81XWH-06-C-0057 awarded by the U.S. Army Medical Research Command. The Government may have certain rights in the invention.

This invention relates to hydrogels, and more particularly to improved elastic epoxy hydrogel polymers and their use.

Hydrogels are a class of polymer chain products that are water-insoluble. Hydrogels are highly absorbent polymer materials and are used in various applications, including biomedical applications.

The present invention provides improvements in hydrogel polymers by providing unique super elastic epoxy hydrogel polymers formed by reacting a polyetheramine with a polyglycidyl ether. The resulting polymer is a super elastic hydrogel having various applications.

Figure 2:
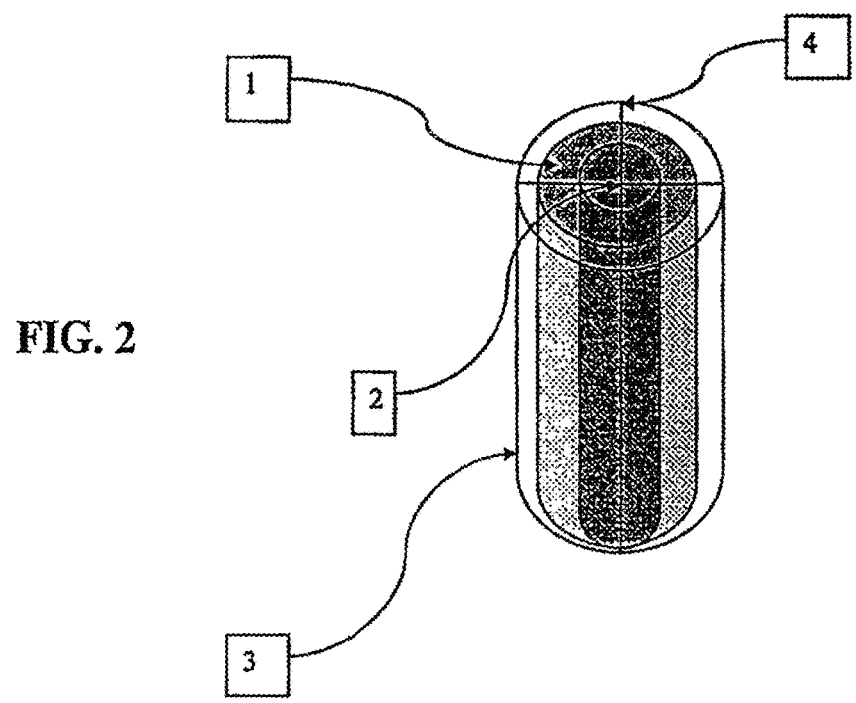

Further features and advantages of the present invention will be seen from the following detailed description, taken in conjunction with the accompanying drawings, wherein like numerals depict like parts, and wherein FIG. 1 is a perspective view of a photo activated polymer gel base actuator structure in accordance with one embodiment;

FIG. 2 is a perspective view of an actuator element made in accordance with the present invention.

The epoxy hydrogel of the present invention can be produced by mixing ratios of ether reactants such as polyethylene glycol diglycidyl ether and polyoxyalkyleneamines and $H_2O$ resulting in an aqueous polymerization of the materials. Particularly preferred are polyoxyalkyleneamines such as commercially available from Huntsman Corporation under the brand name JEFFAMINE® and other polyether amines as an epoxy component that is reacted with various ethers to form epoxy hydrogels. The polyoxyalkyleneamines contain primary amino groups attached to the terminus of a polyether backbone. They are thus "polyether amines." The polyether backbone is based either on propylene oxide (PO), ethylene oxide (EO), mixed propylene oxide/ethylene oxide or may contain other backbone segments and varied reactivity provided by hindering the primary amine or through secondary amine functionality. The material can be cured using heat to speed up the reaction or cured at room temperature over, e.g. 24 hrs. This produces a very wide material handling time window for manufacturing purposes and in the liquid state can be easily poured into molds of various shapes. When the polymer has cured it is extremely flexible, elastic and has expansion ratios of over 1,000% of its dry state volume. Aqueous solutions or solvents may be used for polymerization, and the solvent may be selected from the group consisting of a monomer, polyether amine, a glycidyl ether, and a combination thereof.

The polyether amine may be selected from the group consisting of polyoxyalkyleneamine, and a (poly)alkylene glycol having amino or alkylamino termini selected from the group consisting of polyethylene glycol amine, di-(3-aminopropyl) diethylene glycol, polyetherdiamine, polyoxypropylenediamine, polyoxyethylenediamine, and triethyleneglycol diamine. Furthermore, the polyether amine may have a molecular weight ranging from 1 to 5,000 and may be selected from the group consisting of a monoamine, a diamine, a triamine, a quaternary amine and a mixture thereof.

The polyglycidyl ether may be selected from the group consisting of diethylene glycol diglycidyl ether; ethylene glycol diglycidyl ether; 1,3-butanediol diglycidyl ether; poly(propylene glycol) diglycidyl ether; poly(dimethylsiloxane), diglycidyl ether terminated; neopentyl glycol diglycidyl ether; neopentyl glycol diglycidyl ether, brominated; cyclohexanedimethanol diglycidyl ether, mixture of cis and trans, glycerol diglycidyl ether; diglycerol polyglycidyl ether; glycerol polyglycidyl ether; bisphenol A diglycidyl ether, bisphenol A diglycidyl ether, brominated; bisphenol S diglycidyl ether; bisphenol F diglycidyl ether; bis[4-(glycidyloxy)phenyl]methane; 1,4-butanediyl diglycidyl ether; 4-butanediol diglycidyl ether; bisphenol A propoxylate diglycidyl ether; 1,3-bis(2,3-epoxypropoxy)benzene; 1,3-diglycidyloxybenzene; resorcinol diglycidyl ether; diglycidylresorcinol; diglycidyl resorcinol ether; resorcinol diglycidyl ether; hydroquinone diglycidyl ether; 2,2'-[1,3phenylenebis(oxymethylene)]bisoxirane; m-bis(2,3-epoxypropoxy)benzene; meta-bis(glycidyloxy)benzene; resorcinol bis(2,3-epoxypropyl)ether; trimethylolpropane triglycidyl ether; sorbitol polyglycidyl ether; polyglycerol polyglycidyl ether; pentaerythritol polyglycidyl ether; trimethylolpropane polyglycidyl ether; polyethylene glycol diglycidyl ether; glycidyl ester ether of p-hydroxy benzoic acid; 1,6-hexanediol diglycidyl ether; terephthalic acid diglycidyl ester, and a mixture thereof prior to curing, both the polyether amine and the polyglycidyl ether may be hydrophilic; or alternatively, one of the polyether amine and polyglycidyl ether may be hydrophilic and the other may be hydrophobic.

Other materials may be added during the liquid polymerization to produce unique epoxy polymers with added functionality or to change the physical properties of the cured epoxy hydrogel. For example, by adding an oxide, such as titanium oxide to the liquid epoxy mixture the porosity and texture volume of the polymer will change into a white sponge like material that still performs like a hydrogel. These properties can be further amplified by irradiation of the materials by wavelengths in both the visible spectrum and non visible spectrums of light. The TiO loaded epoxy hydrogel when hydrated will oxidize water or other fluids when it is exposed to UV. This same polymer also works as a glucose detection material when hydrated with blood or interstitial fluid and irradiated. The high surface area within the porous TiO loaded hydrogel structure makes a very efficient hydrogen production media that is extremely low cost and easily manufactured. The added oxide may also be selected from the group consisting of a metal oxide, a mineral oxide, a chemical oxide, and a combination thereof. Also, the oxide may be used as a chemical catalyst, photo catalyst, or electrical catalyst.

An electrically conductive material may also be added. The electrically conductive material may be selected from the group consisting of a conductive polymer, a metal, a carbon, a mineral, an oxide, an acid, a salt, and a combination thereof. The electrically conductive material may also be a nanopowder. Finally, the electrically conductive material may be a liquid solution or suspended in a liquid solution.

A photo-responsive or a photo-sensitive material may also be added. The photo-responsive or photo-sensitive material may be selected from the group consisting of a laser dye, a photo oxidizer, a photo acid generator, a photo initiator, a photosensitizing electron transport material, a hole transport material, a polyaniline, a liquid crystalline material, a photo-luminescent material, a photo-luminescent polymer, a fluorescent polymides, a fluorescent monomer, a light emitting conjugated polymer, a poly(fluorenylene ethynylene) (PFE), a polyfluorene (PFO), a polyacetylene, a polypyridine, a polythiophene, a poly(phenylene ethynylene) (PPE), a polyphenylene vinylene (PPV), a light emitting dopant functionalized polymer, a light emitting organometallic complex, a triplet emitter, a phthalocynine dye, a porphyrin dye, a chromatography dye, and a combination thereof.

The elastic epoxy hydrogel of the present invention also works very well as an ionic actuator material and exhibits superior pressure generation from the swelling kinetics of the amines over other hydrogel or polymer gel actuators. By increasing the density or the number of the amine groups such as secondary and primary amines an increase in swelling pressure is attained in the hydrogel. This also has an effect on the swelling and deswelling times. One way of achieving this is by incorporating Polyamidoamine (PAMAM) polyether dendrimers, polypropylene imine PPI-dendrimers, amino functionalized dendrimers, or combinations thereof, as part of the polymer structure. Dendrimers are highly branched and offer superior numbers of polymer linkage points. They also are commercially available with primary amino surface groups and core amino groups. This makes engineering of the hydrogel possible so that specific performance parameters such as the pressure the gel can produce is determined by formula ratios of materials or by controlling the organization, size and number of branches in polymer structure itself. Hydrogel density and porosity is controlled by amount of amine functionality and molecular weight of the polyether amines. Hydrogel density and porosity is also controlled by amount of polyethylene glycol diglycidyl ether and/or by the ratio of $H_2O$ or solvent used to polymerize the materials. A preferred ether for this gel is polyethyleneglycol-dodecylether (polyEGDE), but other ethers also can be used such as cyclohexanedimethanol diglycidyl ether. These ethers produce a very clear and strong hydrogel that reacts hydrophobicly to high pH aqueous solutions and swells when exposed to low pH or acidic solutions. Hydrogel density and porosity can also be controlled by adding amount of oxidizer to the polymer during polymerization. Whether in solution or dry these oxidizers can be further activated chemically electrically or by photons during polymerization to achieve desired properties.

Ionic hydrogel swelling kinetics are achieved by the difference in pH, ions, cations or protons between the solution outside of the hydrogel and the solution inside of the hydrogel or the polymer composition of the hydrogel. These performance characteristics can be controlled several ways. For example, adding acid to the polymer during polymerization creates a hydrogel that has a higher pH swelling property. Hydrogel swelling kinetics also can be controlled by adding salts or alkali solutions to the polymer during polymerization. This is accomplished by chemical, electrical, electrochemical, photo or photochemical excitation of the epoxy polymer or solution that it is hydrated with.

It is possible to create an electro activated polymer (EAP) by hydrating the epoxy hydrogel in an electrolyte, inserting an electrode into the gel, and spacing a second electrode a short distance from the hydrogel and running low amounts of current through the electrodes. For example, epoxy hydrogel swelling may be increased in the region of a platinum electrode using saline as an electrolyte fluid. When the polarity is reversed, the hydrogel will deswell or contract. Control of hydrophobic and hydrophilic properties also can be achieved by these methods. This same material in a different configuration can also by used as an artificial muscle material or even used to construct an artificial organ.

One drawback of EAP materials for industrial actuation purposes is that the power needed to scale up the technology is prohibitive both in the sheer magnitude and cost. The development of a reversible ionic photo activated polymer (IPAP) actuator material is a way to circumvent the prohibitive power needs and gain industrial acceptance of polymer actuator materials. By doping electro active or ionic polymers with photo reversible ionic sources it is possible to create similar response characteristics to that of ionic EAP actuators. The power needed to drive a single light source would inherently be much less that needed to drive individual EAP actuators as size of application increased, this reduction in power would also be multiplied by the number of actuators in a given system. It is also theorized that the speed of actuation cycles would be increased by diffuse irradiation throughout the material. Even more attractive is the possibility of the material being activated from natural daylight irradiation and the need for electrical power eliminated. Methods to manufacture the elastic epoxy hydrogel for different uses.

The invention will be further described with reference to the following examples.

EAP actuator hydrogels were prepared by reacting the cross linking agent, JEFFAMINE® T-403 available from Huntsman Corporation, with a diepoxide such as an ethylene glycol diglycidyl ether aliphatic difunctional epoxy monomer such as EGDGE available from Dedrich Chemical Company, or GE-PEG500-GE available from General Electric Company. The first generation of actuators consisted of cross linking EGDGE and JEFFAMINE® T-403.

Scheme 1: Synthesis of epoxy-amines crosslinked hydrogels.

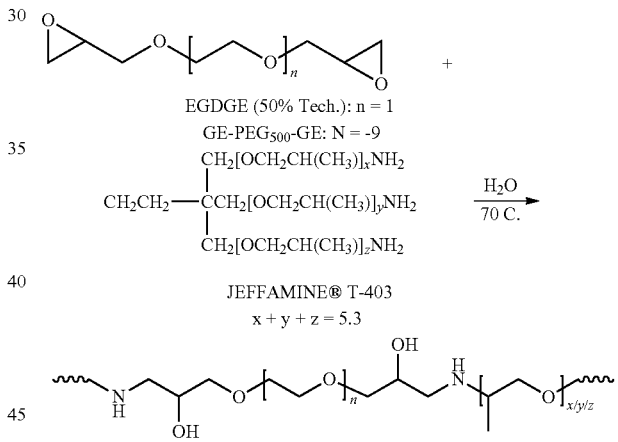

EXAMPLES 1-11

This formulation took into account the 50% purity of the EGDGE. It was determined by 1H and 13C NMR spectroscopy that the impurities in the EGDGE sample from Aldrich contained no additional epoxide residues. The overall process is as follows: a test tube was charged with EGDGE (174 mg, 1.0 mmol, 348 mg of 50% EGDGE), JEFFAMINE® T-403 (391 mg, 0.89 mmol), and water (739 mg). The resulting polymer precursor was mixed thoroughly and allowed to age at room temperature for 0 or 45 minutes (see Table 1). The reaction mixture was then poured into the mold and allowed to cure at 70° C. for 1 hour. The mold, with cured material, was removed from the heat and allowed to cool to room temperature. After cooling, the molded material was hydrated to a state of equilibrium in an electrolyte and are ready to be used as an actuator, or the hydrated material can encapsulated by a flexible material to eliminate and drying out of the hydrogel actuator.

The gelation degree and degree of swelling were based on Lendlein and co-workers. The experiment was conducted as follows: the mass of the actuator (mi) was taken after it had been cured and air-dried for 24 hours. The actuators were then placed in water and allowed to soak for more than 24 hours. The mass of the hydrated actuator (mh) was then taken. These swollen actuators were then removed from the water and allowed to air-dry for 24 hours. This new dried mass (m) was then measured. The table shows the gelation degree and degree of swelling for all the actuators studied.
The formula for the gelation degree (G) is as follows:

$$G = \frac{m}{m_i} \cdot 100\% \quad (1)$$

The swelling degree (Q) of the actuators extracted in water is calculated as follows:

$$Q = 1 + \rho_{gel}\left(\frac{m_k}{m_i \cdot \rho_{H_2O}} - \frac{1}{\rho_{H_2O}}\right) \cdot 100\%$$

where $\rho_{gel}$ is the density of the gel after extraction. The density of the gel was taken after extraction in its dry state. The actuators were almost perfect cylinders and the dimensions were used to calculate the volume, and along with the mass (m), the density ($\rho_{gel}$) could be determined.

EXAMPLES 1-11 (GELS 1-11)

TABLE 1

Formulation of amine-epoxy hydrogels including degree of gelation and swelling data.

| Sample | NH:epox[a] | EGDGE[b] mg (mmol) | JEFFAMINE T-403 mg (mmol) | $H_2O$ mg | Aging time min | Gelation (G) % | Swelling (Q) % |
|---|---|---|---|---|---|---|---|
| Gel 1 | 3:1 | 348 (1.0) | 440 (1.00) | 788 | 0 | 85 | 339 |
| Gel 2 | 2.67:1 | 348 (1.0) | 391 (0.89) | 739 | 0 | 72 | 316 |
| Gel 3 | 4:1 | 348 (1.0) | 587 (1.33) | 935 | 45 | 59 | 409 |
| Gel 4 | 2.67:1 | 348 (1.0) | 391 (0.89) | 739 | 45 | 67 | 214 |
| Gel 5 | 2.67:1 | 348 (1.0) | 391 (0.89) | 739 | 45[d] | 89 | 262 |
| Gel 6 | 2:1 | 348 (1.0) | 293 (0.67) | 641 | 45[d] | 93 | 166 |
| Gel 7 | 2.67:1 | 526 (1.0)[c] | 391 (0.89) | 819 | 0 | 95 | 418 |
| Gel 8 | 2:1 | 526 (1.0)[c] | 293 (0.67) | 819 | 0 | 96 | 472 |
| Gel 9 | 2.67:1 | 526 (1.0)[c] | 391 (0.89) | 459 | 0 | 87 | 668 |
| Gel 10 | 2.67:1 | 526 (1.0)[c] | 391 (0.89) | 917 | 0 | 86 | 722 |
| Gel 11 | 2.67:1 | 526 (1.0)[c] | 391 (0.89) | 1376 | 0 | 86 | 1014 |

[a]Ratio of amine hydrogens to epoxide residues. [b]50% (Tech.). [c]GE-PEG500-GE. [d]Stirred during aging time.

EXAMPLE 12

Ionic photo activated polymers (IPAP) were prepared by the addition of the following materials to the polyether amine and polyglycidyl ether compositions due to their well known photo induced pH swings, excitation spectrum, and relative non hazardous properties, Methylene Blue 0.05% solution (Aldrich) λmax 664 nm, 7 diethylamino-4-methyl coumarin (Aldrich Chemical Company) λmax 390 and a photo acid generator (PAG) diphenyliodonium perfluoro-1-butanesulfonate (Aldrich) λmax 203 nm.

Each of the dry materials were added in varying amounts to the gel formulation typically in increments of 10 mg up 40 mg. Methylene Blue solution was also added incrementally by substituting increasing portions of the $H_2O$ with Methylene Blue solution at 50%, 100% substitution rates.

EXAMPLE 13

Coumarin IPAP hydrogels were formulated by adding the 7 diethylamino-4-methyl coumarin to the PolyEDGE (Aldrich Chemical Company) first then adding JEFFAMINE® T 403 (Huntsman Chemicals) and $H_2O$, the 7 diethylamino-4-methyl coumarin dissolved well at 10 mg and 20 mg, but reside increasingly remained at the 30 mg and 40 mg formulations with large clumps forming at the bottom of the mold at 40 mg. The liquid was poured into Teflon® molds and cured for 2 hours at 70° C. The gels were then allowed to air dry for 24-48 hours. Following the cure process the gels were hydrated with distilled $H_2O$ and allowed to soak over 24 hours. The 10-20 mg gels appeared clear yellow, the 30 mg gels appeared hazy yellow and the 40 mg gels appeared hazy and speckled and fell apart at the bottom portion of the mold.

EXAMPLE 14

Photo acid generator IPAP hydrogels were formulated by adding 10 mg of the diphenyliodonium perfluoro-1-butanesulfonate was added to the PolyEDGE and dissolved well, JEFFAMINE® T403 was then added followed by $H_2O$ to complete the polymerization. The material was then poured into molds and cured for 2 hours at 70° C. Gels were then allowed to air dry for 24-48 hours and then hydrated with $H_2O$ for 24 hours, 2 samples were set aside and soaked in a solution of sodium perchlorate 0.1N.

EXAMPLE 15

Methylene Blue IPAP hydrogels were formulated using a Methylene Blue 0.05% solution following the above protocol. The Methylene Blue was added with the $H_2O$ step in the aqueous polymerization 50% substitution and then 100% substitution. The material was then poured into molds and cured for 2 hours at 70° C. Gels were then allowed to air dry for 24-48 hours, the samples were then hydrated with $H_2O$ for 24 hours, 2 samples were set aside and soaked in a solution of sodium perchlorate 0.1N.

The Methylene Blue gel and the PAG gel hydrated with the sodium solution experienced much faster contraction speed upon irradiation then the same gels in $H_2O$. These gels experienced full contraction in less than 15 minutes and had some fracturing due to this rapid deswelling of the gel. This rapid deswelling ion flow indicates it should be possible to make a dry composite actuator using an ion exchange membrane and clear exterior polymer layer of a hydrophobic photo sensitized polymer.

Hydro gel structures of the present invention that can be engineered to have various or varying porosity for various uses such as actuators, drug delivery, drug therapy, wound healing, absorbent, filter material, filtration system, porous tissue scaffolding, porous blood vessel and capillary scaffolding, porous encasement or surface for bio implantable devices and sensors, porous encasement or surface for bio implantable prosthesis and parts, porous encasement or surface for implantable cell cultures, porous encasement or surface for cell cultures, porous encasement or surface for chemical and biological cultures, porous substrate or coating for bio and chemical sensors. A particularly advantageous application is in pulse activated pump systems as described in PCT application Nos. PCT/US04/05922 and PCT/US05/45210, the contents of which are incorporated herein in their entirety, by reference. Other uses are where a porous and flexible hydrogel substrate or coating would improve the properties or performance or features of an existing product.

The hydrogels of the present invention can be used in situ by injecting mixed epoxy components into desired area within the body, such as to replace or repair a disc between vertebrae in the spinal area. The epoxy will cure in situ and expand to the desired volume by absorbing interstitial fluid or by injecting a fluid into the epoxy once it has cured. The injected fluid can be something as simple as saline buffered to match the hydrogel pH responsive swelling. As a drug or other delivery device the epoxy can be loaded with a desired material in wet or dry form and then implanted and allowed to hydrate naturally from body fluids or have the hydration fluids injected. Once the implanted epoxy hydrogel is hydrated the drug can leach out or the epoxy hydrogel material can be stimulated via the bodies natural ph response, using electric current, photon irradiation or combination of these to contract and deliver the desired material or drug at a desired rate. The implanted material can also be refilled via injection if needed.

Epoxy and other hydrogels can be used as buoyancy devices and buoyancy control for micro and small unmanned underwater vehicles (UUV), large UUV, submarines and other submersibles, personnel floatation devices, sensor platforms, buoys, chemical or biological material release mechanisms for aqua farming etc.

By controlling flow of fluids in and out of the gel, positive, negative and neutral buoyancy can be achieved from a polymer gel. Hydrophobic control via chemical, electrical or photo activation can control the timing and amount of materials or chemicals to be released in an aqueous environment. Hydrogels swollen with water can go to great depth due to the polymer structure being surrounded by the environment it is in, and the fact that it does not contain any compressible or expandable gasses. Activation of the gel can produce ion flow out of the gel forcing the gel to swell. Activation of hydrogels with reactive dopants such as TiO also can produce gasses in or around the gel enabling the gel to rise or increase its buoyancy. The same effect can be accomplished by controlling the hydrophobic or hydrophilic properties of the gel.

Hydrogels of the present invention also can also be used as a bacteria, microbe or other biological material growing media where in the microbe produces an end product, chemical or reaction that is desired, for example, as a hydrated hydrogel containing a marine microbe that produces a chemical when exposed to light. A photo sensitive hydrogel would start to expel fluid that it is hydrated while the microbe is producing the desired chemical. This becomes an efficient pump or delivery system that needs very little to sustain it, yet can operate on a continuous cycle or in reaction to a change in its surrounding environment. In this way it becomes a living chemical, environmental or biological sensor that can produce a signal or even a counter reaction, in and around it as the surrounding changes occur. This is efficient for the hydro farming of fish and other food sources that need to be in an aqueous environment or aqueous solutions provided to them.

The ph gradient within the polymer structure is changed from its surrounding environment when exposed to irradiation in the same light spectrum the doped polymer is designed to react to, creating an ionic flow either into or out of the polymer structure that is photo activated. By sandwiching the non-transparent membrane or ionic polymer between the photo-activated layers, motion is achieved by the contraction or expansion of the opposing sides with the outer layer that is sealing the entire structure.

A similar effect can be achieved by doping the hydrating solution or electrolyte of the hydrogel with photo oxidizers, photo acid generators, photo initiators or laser dyes such as but not limited to these materials that the gel is hydrated with, creating a photolyte or photolytic solution. The solution will reversibly change its pH when irradiated with energy in an on and off manner causing the polymer to swell or deswell according to the resulting change in the pH in and around the polymer structure. The described devices and applications of the invention are not intended to limit the scope of the invention, these are only a few of the many applications possible.

The IPAP material also can be used as a new photo responsive composite and act similar to a plant, by bending towards or tracking the sunlight during a daylight cycle. A simple practical application is a pole for solar panels. The pole would bend towards the sun, being the shrinking or contracting side of the composite, and it would be exposed to direct sunlight and tip or angle the attached solar panel towards the sun. This could be done using no electricity at all and therefore increasing the efficiency of solar panels. Another possibility of commercial use is water pumps that do not need electricity and can pump in response to daylight cycles or with a simple mechanical shutter that would open and close according to the size of the actuator.

Referring now to the drawings, there is illustrated an exemplary use of a photo activated polymer gel in accordance with the present invention in a sealed structure or actuator with an external semi rigid or flexible outer layer (3) that allows a desired amount of light through to the next layer of the photo activated polymer (1) then by using a membrane (4) or another get (2) that does not allow light through but does allow ions to pass or flow through to the photo activated polymer layers on each side of it or surrounding it. In this configuration it is possible to build an actuator or device such as a stand for a solar cell that will bend in the direction of the sun. This provides a non-electrical method of tracking the sun for the most efficient exposure angle of the photovoltaic to the sun's rays but does not use any electricity making a more energy efficient system.

There are many other products that this could be used in such as pump mechanisms that work without electricity. All that would be needed are light and dark cycles, such as day and night, to provide the movement needed to pump or composite structures that unfold when exposed to light or other radiation. This is possible by the same ion flow that is driven by electricity in the electro active polymers but by using photo oxidizers, photo acid generators, photo initiators or laser dyes but not limiting the invention to these materials, the pH gradient within the polymer structure is changed from its surrounding environment when exposed to irradiation in the light spectrum the doped polymer is designed to react to, creating an ionic flow either into or out of the polymer structure that is photo activated. By sandwiching the non-transparent membranes (4) or ionic polymer (2) between the photo activated layers (1), motion is achieved by the contraction or expansion of the opposing sides with the outer layer (3) sealing the entire structure.

Still other changes are possible without departing from the spirit and scope of the invention.

What is claimed is:

1. An elastic volume changing epoxy hydrogel polymer composition comprising (a) the reaction product of a polyether amine and a polyglycidyl ether; (b) at least one metal oxide to control swelling, density and porosity characteristics of the polymer structure; (c) a photo responsive or photo-sensitive material selected from the group consisting of a laser dye, a photo oxidizer, a photo acid generator, a photosensitizing electron transport material, a hole transport material, a polyaniline, a liquid crystalline material, a photo-luminescent material, a photo-luminescent polymer, a fluorescent polymides, a fluorescent monomer, a light emitting conjugated polymer, a poly(fluorenylene ethynylene), a polyfluorene, a polyacetylene, a polypyridine, a polythiophene, a poly(phenylene ethynylene), a polyphenylene vinylene, a light emitting dopant functionalized polymer, a light emitting organometallic complex, a triplet emitter, a phthalocynine dye, a porphyrin dye, a chromatography dye, and a combination thereof, to control ionic flow into or out of the polymer structure; and (d) a conductive polymer, a metal, a carbon, a mineral, an acid, a salt, and a combination thereof, in the form of nanoparticles.

2. The composition of claim 1, wherein said polyether amine is selected from the group consisting of polyoxyalkyleneamine, and a (poly)alkylene glycol having amino or alkylamino termini selected from the group consisting of polyethylene glycol amine, di-(3-aminopropyl) diethylene glycol, polyetherdiamine, polyoxypropylenediamine, polyoxyethylenediamine, and triethyleneglycol diamine.

3. The composition of claim 2 wherein the polyetheramine comprises a polyether backbone with primary amino groups attached to its terminus, and wherein the polyether backbone is selected from the group consisting of propylene oxide, ethylene oxide, mixed ethylene oxide/propylene oxide, another backbone segment of varied reactivity provided by hindering the primary amine or through secondary amine functionality, and a mixture thereof.

4. The composition of claim 1, wherein said polyether amine has a molecular weight of 5,000 or less and is selected from the group consisting of a monoamine, a diamine, a triamine, a quaternary amine and a mixture thereof.

5. The composition of claim 1, wherein said polyglycidyl ether is selected from the group consisting of diethylene glycol diglycidyl ether; ethylene glycol diglycidyl ether; 1,3-butanediol diglycidyl ether; poly(propylene glycol) diglycidyl ether; poly(dimethylsiloxane), diglycidyl ether terminated; neopentyl glycol diglycidyl ether; neopentyl glycol diglycidyl ether, brominated; cyclohexanedimethanol diglycidyl ether, mixture of cis and trans, glycerol diglycidyl ether; diglycerol polyglycidyl ether; glycerol polyglycidyl ether; bisphenol A diglycidyl ether, bisphenol A diglycidyl ether, brominated; bisphenol S diglycidyl ether; bisphenol F diglycidyl ether; bis[4-(glycidyloxy)phenyl]methane; 1,4-butanediyl diglycidyl ether; 4-butanediol diglycidyl ether; bisphenol A propoxylate diglycidyl ether; 1,3-bis(2,3-epoxypropoxy)benzene; 1,3-diglycidyloxybenzene; resorcinol diglycidyl ether; diglycidyl resorcinol; diglycidyl resorcinol ether; resorcinol diglycidyl ether; hydroquinone diglycidyl ether; 2,2'-[1,3phenylenebis(oxymethylene)]bisoxirane; m-bis(2,3-epoxypropoxy)benzene; meta-bis(glycidyloxy)benzene; resorcinol bis(2,3-epoxypropyl)ether; trimethylolpropane triglycidyl ether; sorbitol polyglycidyl ether; polyglycerol polyglycidyl ether; pentaerythritol polyglycidyl ether; trimethylolpropane polyglycidyl ether; polyethylene glycol diglycidyl ether; glycidyl ester ether of p-hydroxy benzoic acid; 1,6-hexanediol diglycidyl ether; terephthalic acid diglycidyl ester, and a mixture thereof.

6. The composition of claim 1, wherein the metal oxide functions as a chemical catalyst, photo catalyst or electrical catalyst.

7. The composition of claim 1, wherein the nanoparticles are suspended in, or are in the form of a liquid solution.

8. The composition of claim 1, wherein an aqueous solution or a solvent is used for polymerization.

9. The composition of claim 8, wherein the solvent is selected from the group consisting of a monomer, a polyether amine, a glycidyl ether and combination thereof.

10. The composition of claim 1, wherein the polyether amine is hydrophilic and the polyglycidyl ether is hydrophilic prior to curing.

11. The composition of claim 1, further comprising a dendrimer selected from the group consisting of a polyamidoamine polyether dendrimer, a poly(propylene-imine) PPI-dendrimer, an amino-functionalized dendrimer, and combination thereof, incorporated in the polymer structure.

* * * * *